United States Patent [19]
Zinniel et al.

[11] Patent Number: 6,085,957
[45] Date of Patent: *Jul. 11, 2000

[54] VOLUMETRIC FEED CONTROL FOR FLEXIBLE FILAMENT

[75] Inventors: Robert L. Zinniel, Richfield, Minn.; John S. Batchelder, Somers, N.Y.

[73] Assignee: Stratasys, Inc., Eden Prairie, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/629,268

[22] Filed: Apr. 8, 1996

[51] Int. Cl.[7] .......................... B65H 20/00; B23Q 15/00
[52] U.S. Cl. ................................. 226/8; 226/43; 226/45
[58] Field of Search ................. 226/24, 45, 26, 226/42, 43, 8

[56] References Cited

U.S. PATENT DOCUMENTS

| | | | |
|---|---|---|---|
| 3,017,060 | 1/1962 | Miller | 226/10 |
| 4,019,691 | 4/1977 | Wroclawski et al. | 242/45 |
| 4,820,281 | 4/1989 | Lawler, Jr. | 604/253 |
| 4,932,581 | 6/1990 | Ohle et al. | 228/102 |

FOREIGN PATENT DOCUMENTS

| | | | |
|---|---|---|---|
| 3545728 | 6/1987 | Germany | 226/24 |
| 0590226 | 1/1978 | U.S.S.R. | 226/24 |
| 0610580 | 6/1978 | U.S.S.R. | 226/24 |

*Primary Examiner*—John A. Jeffery
*Assistant Examiner*—Matthew A. Kaness
*Attorney, Agent, or Firm*—Kinney & Lange, P.A.

[57] ABSTRACT

A volumetric feed control apparatus for a build material element such as a filament used in a three-dimensional modeling machine having an application tip includes a pair of feed rollers feeding the filament to the application tip, and a sensor or sensor system feeding information to a central processing unit that continuously computes the effective cross section of the filament using the signals received from the sensor or sensor system. The central processing unit controls the speed of a DC servo or stepper motor which in turn rotates the feed rollers to advance the filament toward the application tip of the modeling machine. The central processing unit adjusts the speed of the feed rollers to supply a constant flow rate of material to the application tip. Alternatively, the sensor system can be incorporated into the feed rollers, eliminating the need for further space constraints.

40 Claims, 2 Drawing Sheets

VOLUMETRIC FEED CONTROL FOR FLEXIBLE FILAMENT

BACKGROUND OF THE INVENTION

The present invention relates generally to the field of forming three-dimensional objects. Specifically it relates to volumetric feed control of a build material element in three-dimensional modeling.

Three-dimensional modeling machines in the current art often use build elements made from a build material such as a filament, often wound on a roll, that are fed to the machine by the use of feed rollers or other devices. In the modeling machine, the material is melted before being dispensed at an application tip. The filament is preferably made of a material that will rapidly solidify upon a small drop in its temperature. Materials often used for modeling include waxes, thermoplastic resins, and various metals.

Build material elements have varying configurations, but typical elements used in the field of three-dimensional modeling must currently be manufactured to a high degree of accuracy due to the tolerance limits imposed by current modeling machine technology. The tolerance limits imposed on build material elements by the current technology are in the area of 4 per cent of volume. Typically, the build material element is in the form of a cylindrical filament approximately 0.070 inches in diameter, with a required tolerance of +/−0.0015 inches. In current modeling systems using this filament, if the filament exceeds tolerance by either being too large or too small, the machine may plug or the part become corrupted. Also in current systems, the accuracy of the model created is dependent upon the accuracy of the filament supply. When the filament varies in cross section, the volume of material delivered to the application tip of the machine does not remain constant, and therefore the flow rate of material fluctuates. When the filament is too large, there may be a build-up of excess filament at the application tip, resulting in a model layer that is too thick. Similarly, when the filament is too small, there may be a shortfall or lag of filament at the application tip, resulting in a deposited layer that is too thin, or that leaves gaps in the model. Both situations may easily lead to model failure. An uncontrolled flow rate, even when the fluctuations are small, can contribute to large variations in the quality of the final model, including gaps and excess thickness.

The three-dimensional modeling machines of the current art use flexible filament, often stored on a roll, that is fed to an application tip by the use of feed rollers. Although attempts have been made at constant volumetric control of melted filament at the application tip, proposed solutions have not controlled the problem enough to allow a tolerance level change in the filament used. An excess of material leads to overthick layers, and a shortfall leads to unacceptable gap or thin wall errors in modeling.

Various prior art designs for automatic feed control and variable speed feeding exist. For example, U.S. Pat. No. 3,017,060 to Miller discloses an automatic feed control mechanism for wire filaments. Miller teaches an intermittent feed of the filament, the filament having segments of varying cross-sectional area. No continuous measuring of the wire diameter, cross sectional area, or effective cross section is taught by Miller. No continuous adjustment of filament feed speed in response to changes in wire diameter is taught by Miller.

U.S. Pat. No. 4,932,581 to Ohle et al. discloses the controlled speed feeding of a predetermined length of solder wire to a soldering location. Ohle et al. uses force sensors to determine feed force or speed by converting force to a proportional electric signal controlling an electric motor. Ohle et al. does not teach any type of sensing device for measuring the diameter, cross sectional area, or effective cross section of the solder wire. Adjustment of the feed controller for solder wire thickness is done manually, and only for a nominal diameter. No adjustments are made due to any variance from nominal diameter.

Several patents disclose various devices to control feeding of fibers or yarn. For example, U.S. Pat. No. 4,019,691 to Wroclawski et al. discloses winding of yarn onto a bobbin at a variable and controlled speed. The speed is dependent upon the volume of yarn held in a receptacle. Sensors in the receptacle are of variable type, including photoelectric sensors. The sensors determine the volume of yarn in the receptacle. The winding shaft in Wroclawski et al. rotates at a constant speed. The variable yarn winding speed is accomplished by use of a coneshaped bobbin. A different contact point on the bobbin results in a different yarn winding speed. Wroclawski et al. discloses no monitoring or sensing of the diameter of the yarn to control feed speed. The feed speed of the yarn is constant.

U.S. Pat. No. 4,820,281 to Lawler, Jr. discloses measurement of the volume of a drop of liquid and control means for regulating flow of a liquid. The volume of drops of liquid in an IV tube is calculated by timing circuits activated by photoelectric sensors to measure the time it takes for the drop to fall a known distance. Volumetric flow rate is determined by multiplying drop volume and drop rate, and is adjusted according to a predetermined flow rate. No continuous feeding of a solid element is taught by Lawler, Jr. No continuous monitoring of diameter, cross sectional area, or effective cross section of a filament is taught by lawler, Jr. The teaching of Lawler, Jr. is unworkable when dealing with solids.

It would be desirable to provide an apparatus for continuous volumetric control of build material fed to the extrusion head of a three-dimensional modeling machine. Such an apparatus should be adaptable to be added to an existing machine, as well as added at the manufacturing stage.

BRIEF SUMMARY OF THE INVENTION

It is an object of the present invention to provide a volumetric feed control system that will allow for an increased tolerance range in build element effective cross section, in other words, a loosening of the strictness of the tolerance requirements.

It is another object of the present invention to improve the constancy of the flow rate of fluid delivered through the application tip of a three-dimensional modeling machine.

It is yet another object of the present invention to provide a feed control system suitable for installation on an existing three-dimensional modeler including the type disclosed in U.S. Pat. No. 5,121,329 to Crump, which is hereby incorporated by reference, and which will require little modification of existing equipment.

The present invention achieves these objects by providing a system for continuously measuring, computing, and monitoring the effective cross section of a build material element such as a filament as the element is fed to the melting unit or application tip of the modeling machine, and adjusting the speed at which the element is fed to the melting unit or the application tip to ensure a more constant flow rate of fluid at the application tip.

Build material element is fed to a modeling machine by an advancement mechanism including a motor. The motor can be a stepper motor or a DC servo motor. In the present invention, the build element is advanced to the dispensing head by the advancement mechanism. The effective cross section of the element is determined through the use of sensing means and a central processing unit. Various configurations for determination of effective cross section may be used, for example infrared emitter and detector pairs, tungsten filament and infrared detector arrays, pinch rollers and linear variable differential transformers (LVDT), and capacitive measurement.

There is usually a spatial gap between the sensing means and the application tip of the three-dimensional modeler. Therefore, a lag response exists in the system. A variance in filament cross section will not immediately affect the volume of filament material present at the application tip. To combat this delay, the distances between the sensing means and the application tip as well as between the sensing means and the center of the modeler advancement mechanism are provided to the central processing unit. The sensing means provide continuous signals to the central processing unit which can then compute the effective cross section of the filament. The motor of the advancement mechanism is connected to the central processing unit to allow the central processing unit to know the speed of the motor at all times. Since the central processing unit knows the speed of the motor and receives measurements from the sensing means, the effective cross section of the element may be continuously computed. Necessary changes to motor speed and hence feed roller speed and the proper times to effect the changes in speed may therefore be controlled by the central processing unit to ensure that the lag response is continuously and properly compensated.

The volumetric feed control apparatus of the present invention will allow the tolerance of flexible filament to be increased. In other words, the filament diameter accuracy level required by the present invention is less than that previously required by the prior art. The reason for this is the use of more accurate methods of providing a constant flow rate of filament to the modeling machine application tip. This relaxed tolerance requirement will considerably cut the manufacturing costs of filament, and therefore of models created by modeling machines.

Further, any existing system using a roller feed method of feeding a flexible filament to a modeler may easily use the present invention. Insertion of the sensing means into an existing system may be easily accomplished. The central processing unit may be located anywhere, provided that proper connections are made to the sensors and to the motor controlling the advancement mechanism. No changes other than the drive control of the motor, and the possible addition of an encoder feedback to the motor are necessary.

Typically, the build material element is configured in the shape of a cylindrical filament, normally wound on a spool or stored in a roll. However, the element may be supplied in a wide variety of configurations, including ribbons, tubes, extrusions of triangular, trapezoidal, or pentagonal shape, and the like. The build material element may also be supplied in discrete quantities, and need not be wound on a spool.

These and other objects and benefits of the present invention will become apparent from the following detailed description thereof taken in conjunction with the accompanying drawings, wherein like reference numerals designate like elements throughout the several views.

DESCRIPTION OF THE PREFERRED EMBODIMENTS

Figure 1:
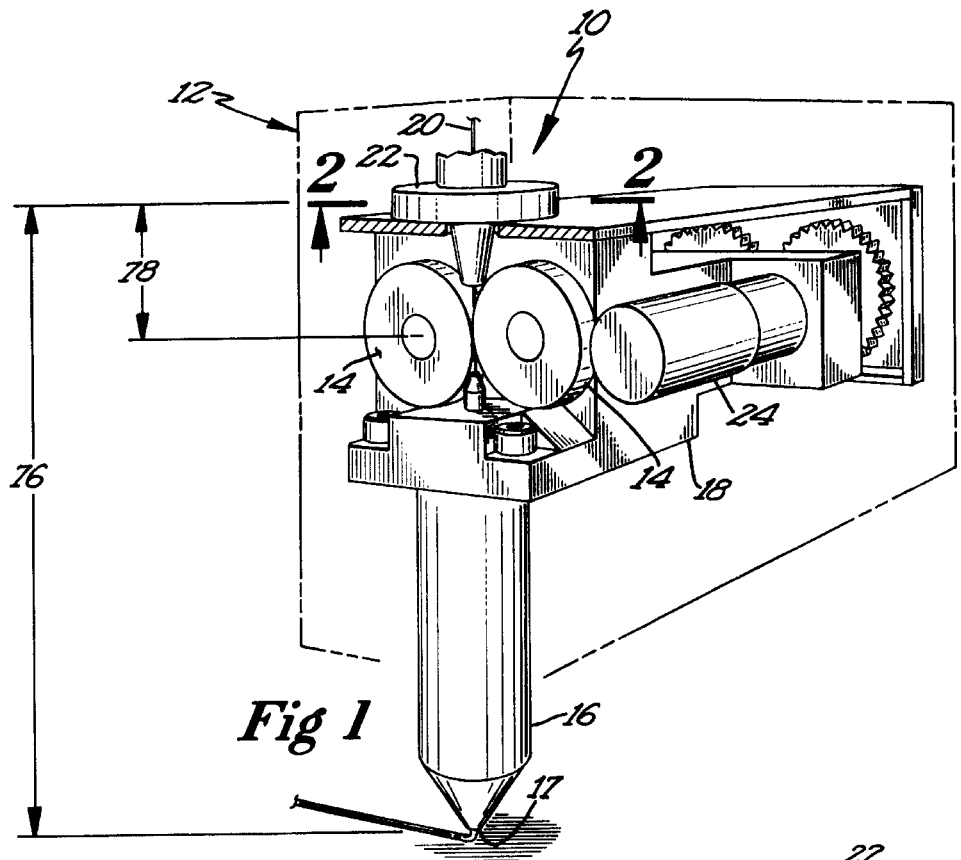
FIG. 1 is a perspective view of an embodiment of the volumetric feed control in place on a machine.

Referring now to the drawings, FIG. 1 shows the volumetric feed control 10 in place on a three-dimensional modeling machine 12, the machine 12 having an element advancement mechanism such as feed rollers 14, a dispensing head 16 with an application tip 17, and a frame 18. A build material element such as filament 20 is fed to machine 12 from a build element source, not shown, which may be a spool or roll of material, or another such storage device. Build material is often formed as a filament such as filament 20, but may take other configurations. Such other configurations include those of different cross sections. Further, the build material element may be supplied in discrete quantities, and need not be wound in a roll or on a spool.

Volumetric feed control 10 may include dimension control ring 22 and DC servo motor 24 with encoder feedback. Dimension control ring 22 contains sensing means 23 to determine the effective cross section of a build material element such as filament 20 being fed through the dimension control ring 22.

Cross sectional area is often used to estimate volume. Also used are diameter measurements. These methods of determining volume only work when no anomalies are present. Such methods of measurement, especially using conventional instruments and techniques, fail to take into account that if only a diameter measurement is made, a volume computation is meaningless if the element being measured is hollow. The effective cross section is a measurement that takes into account such factors as the cross sectional area of the element, known quantities such as length, width, and diameter, and other information, such as whether the element is hollow, oblong, or the like. The use of effective cross section reduces the possibility for miscalculation due to various physical factors of the element. A more accurate volume calculation may then be made. The sensing means 23 is operatively connected to a central processing unit 74, and continuously gathers data and feeds information signals measuring the build material element being fed therethrough to the central processing unit 74. The central processing unit is also operatively connected to a motor 24, which may be a DC servo motor or a stepper motor. Motor 24 is in turn operatively connected to feed rollers 14 or an other element advancement mechanism which may be used on the modeling machine. The central processing unit 74 controls the speed at which the motor 24 turns, and therefore the speed at which the advancement mechanism rotates to pull the build material element through the dimension control ring 22. Central processing unit 74 adjusts the speed of motor 24 in order to provide a constant flow rate of build material element to dispensing head 16 and application tip 17.

Sensing means 23 need not be housed in a dimension control ring 22. It may be mounted at any place in which it win be positioned to make measurements on element 20.

Sensing means 23 is preferably positioned between any driving contact means such as feed rollers 14 and the application tip 17. This is because the driving contact means may affect the effective cross section of the element due to forces imparted by the feed rollers 14 or other mechanical driving means. Sensing means 23 may even be incorporated into the element advancement mechanism, such as by mounting the feed rollers to communicate with a linear variable differential transformer as described below.

Figure 2:
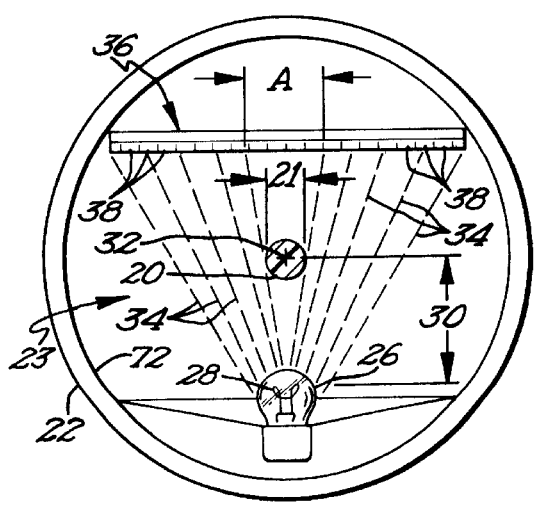
FIG. 2 is a view of an embodiment of the sensing system of FIG. 1, taken along line 2—2 thereof.
Figure 3:
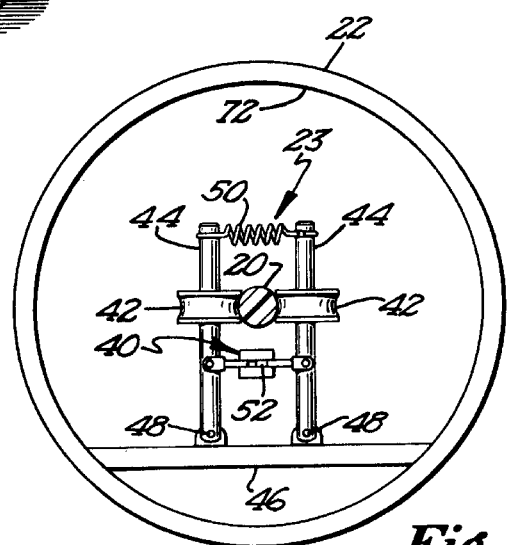
FIG. 3 is a view of an alternative embodiment of the sensing system of FIG. 2.
Figure 4:
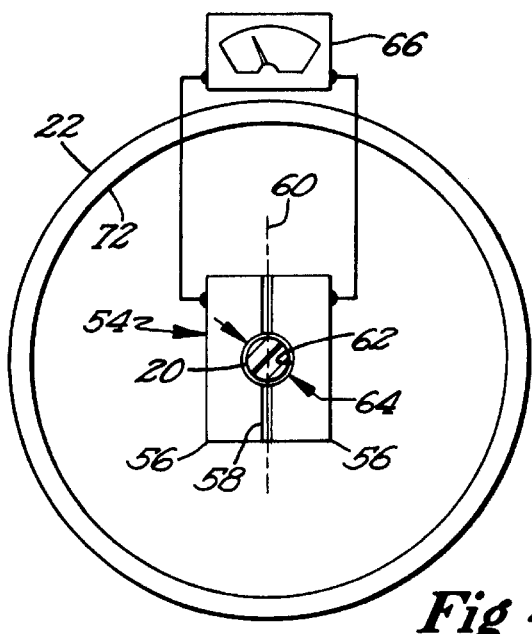
FIG. 4 is a view of another alternative embodiment of the sensing system of FIG. 2.

Referring now also to FIGS. 2–4, various embodiments of the sensing means 23 may be seen. In FIG. 2, filament 20 is shown substantially centered in dimension control ring 22. As has been mentioned, dimension control ring 22 is not required. The sensing means 23 may be mounted elsewhere. Although in this configuration it is preferred that filament 20 be centered in dimension control ring 22, it is not necessary. In FIG. 2, a tungsten halogen lamp 26 is oriented with its lamp filament 28 parallel to and a fixed predetermined distance 30 from the axis 32 of filament 20. The emitted light 34 from the lamp 26 creates a shadow of the filament 20 on a linear CCD array 36. The shadow width is designated as letter A (FIG. 2). Shadows of different widths A will cause a variation in the number of array pixels 38 that are illuminated by the light 34 from lamp 26. The width 21 of filament 20 may then be determined using standard clocking and preamplification techniques known in the art and not further described herein. These measurements are used to generate an effective cross section of filament 20.

Referring to FIG. 3, a sensing means 23 using a three-coil linear variable differential transformer (LVDT) 40 and a pair of dimension rollers 42 is shown. Dimension rollers 42 are mounted to shafts 44. Each shaft 44 is flexibly attached to rigid mount 46 by a suitable mounting apparatus, such as pins 48. Rigid mount 46 is attached to the interior surface 72 of the dimension control ring 22, but may also be attached at any fixed point on the frame of the modeling machine. The dimension rollers 42 are biased toward each other by spring 50 attached between shafts 44. Each shaft 44 also carries an attachment for LVDT 40 which is attached therebetween. The terminals of LVDT 40 are operatively connected to rollers 42, one terminal to each roller. As has been described above, the rollers 42 may be used with multiple functions, such as to also serve as feed rollers for element advancement, or encoding the element velocity.

Filament 20 passes between dimension rollers 42. As the filament diameter changes, the dimension rollers 42 respond by moving, causing motion of the shafts 44. The movements of the dimension rollers 42 cause the core 52 of LVDT 40 to change position within LVDT 40. Sense circuits known in the art may be employed to translate the relative changes in core 52 position and inductance in the LVDT coils to an analog voltage which may be used to compute the effective cross section of the filament 20.

FIG. 4 shows a third embodiment of the sensing means 23 used in the dimension control ring 22 or alternatively mountable directly to the modeling machine. In this embodiment, the filament effective cross section is calculated using information from a capacitive sensor 54. The sensor 54 is comprised of a pair of conducting plates 56 sandwiching a thin insulator 58 therebetween. A typical insulator 58 is mylar, approximately 0.002 inches in thickness. Insulator 58 lies in a plane 60 through which a hole 62 is drilled, the hole 62 being coaxial with the axis 32 of build filament 20 and coplanar with plane 60, and exposing the conductive plates 56. The diameter 64 of hole 62 is slightly larger than the diameter of the largest filament 20 expected to be used with the modeling machine. A capacitance meter 66 is attached to the conductive plates 56. Changing diameter of the filament 20 will cause a change in capacitance that may be translated in known fashion to the cross sectional area of the filament. This method of determining the effective cross section of the filament 20 is independent of its cross sectional shape, since the capacitive sensor 54 essentially measures the percentage of the hole 62 that is filled with filament 20 as opposed to air. The capacitance measurement scheme may also be used to detect the presence of absorbed water in the filament 20, since the filament 20 material and water have different capacitive properties.

Figure 5:
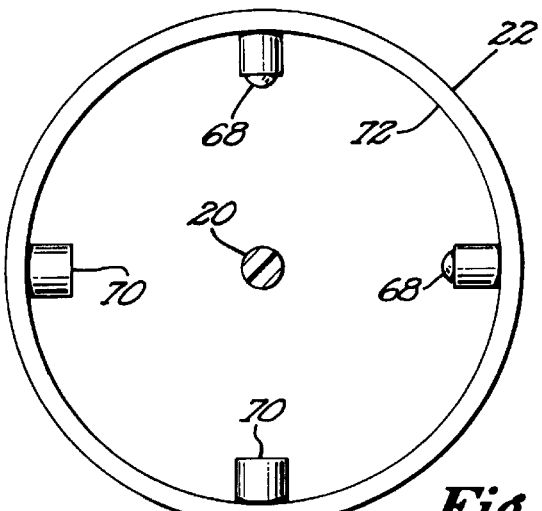
FIG. 5 is a view of yet another alternative embodiment of the sensing system of FIG. 2.
Figure 6:
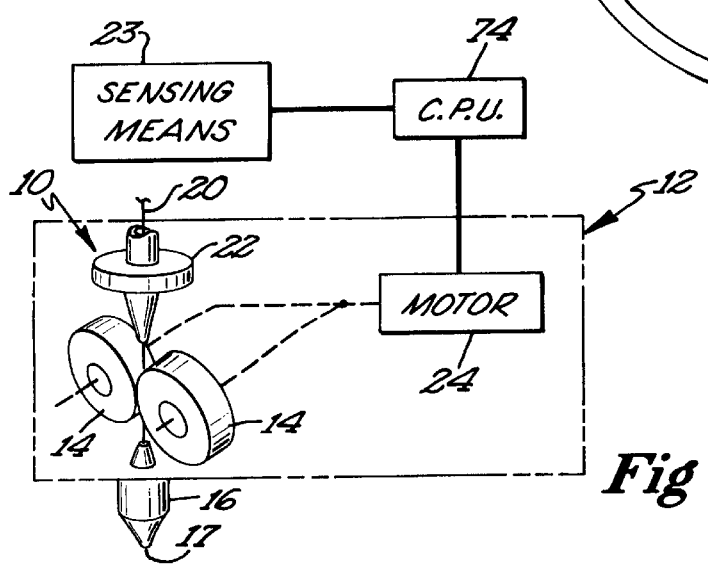
FIG. 6 is a partial block diagram of a control system for the volumetric feed control.

Yet another alternative embodiment (FIG. 5) of the sensing means 23 comprises at least one set of emitter/detector pairs 68, 70 spaced 180 degrees apart around the axis of the filament 20. The emitter/detector pair 68, 70 is situated so that the filament 20 will pass through the beam from emitter 68 as the filament 20 is advanced by feed rollers 14. The emitter 68 sends out a light signal or beam that may be partially occluded by filament 20 and which is detected by the opposite detector 70. If the filament 20 changes in size, the intensity of the beam detected by the detector 70 will change, allowing a measurement which may be used to calculate the filament effective cross section. Preferably, a plurality of emitter/detector pairs are spaced at equal intervals around the axis of filament 20 in order to more accurately detect and measure the effective cross section of the filament 20 as it is advanced by the advancement mechanism.

Other types of sensors are also compatible with the volumetric feed control 10, and could be used in place of the emitter/detector pairs. Such other sensors include but are not limited to opto-electric sensors, miniature CCD cameras, fiber optic sensors, mechanical bladder ring sensors, or pinch roller sensors. All could send information that may be used to determine the effective cross section of the flexible filament to the central processing unit 74.

The various sensing means 23 described above each send a signal corresponding to the filament effective cross section to central processing unit 74. The central processing unit 74 computes the effective cross section and the required feed speed of the filament 20 to provide a constant flow rate of build material to the application tip 17 of the dispensing head 16, and adjusts the speed of motor 24 which controls the speed of filament feed by controlling the speed of the advancement mechanism such as feed rollers 14. This adjustment ensures that any changes in the effective cross section of the filament 20 will result in a corresponding change in the speed at which the filament 20 is fed.

If further accuracy of effective cross section measurement and testing of properties of the filament 20 is desired, two or more sensing means may be combined or used in sequence to determine multiple properties of the filament 20 and provide a reference for averaging computed values. For example, an LVDT sensing means as described above may be used along with a capacitive sensor as also described above, in order to determine both the outer dimension and the water content of the filament 20. Consequently, the tolerance of a filament with nominal diameter of 0.070 inches can be increased substantially from +/−0.0015 inches.

Another way to increase the accuracy of the effective cross section is to more closely monitor the effective velocity of the element. Although the rotational speed imparted by the element advancement mechanism provides a good approximation of the element velocity, the approximation may be in error due to a number of factors. The element advancement mechanism itself often requires a groove such as that shown in FIG. 3 on rollers 42 in order to seat the build material element properly. The angular velocity of the rollers and accordingly the linear velocity imparted by the rollers differs at the outer periphery and at the central most portion of the groove. To combat such inaccuracies, the element advancement mechanism may be encoded for element velocity. When such an account is made of effective element velocity, this measure may be combined with effective cross section to more accurately compute the volumetric flow rate.

Build material elements may be fabricated in a variety of cross sectional shapes and geometries, including ribbons, tubes, extrusions of triangles, trapezoids, pentagons, and other polyhedra. The measurement techniques described above may be adapted to these alternative geometries.

In operation, the volumetric feed control 10 works as follows. The sensing means 23 sends measurement signals to central processing unit 74. Central processing unit 74 uses the signals to continuously compute the effective cross section of the build element. In response to this known quantity, central processing unit 74 is able to adjust the feed speed of the build element by adjusting the speed of motor 24 controlling the feed rollers 14 that advance the build element toward the dispensing head 16 and application tip 17. The adjustment is made so that a constant flow rate of build material is fed to the dispensing head 16.

A time lag exists between the computation of build element effective cross section and the arrival of the particular measured portion of the element at the application tip 17. Consequently, a change in effective cross section of the build element at the sensing means 23 does not immediately translate to a change in volume of material at the application tip 17. The change in build element effective cross section will affect the volume of material at the application tip at some point in time after it passes the sensing means 23.

To account for this lag, the central processing unit 74 must know the distance 76 between the application tip 17 and the sensing means 23, as well as the distance 78 between the sensing means 23 and the center of feed rollers 14. The connection of motor 24 to the central processing unit allows it to know or compute at all times both the effective cross section of the build element and the speed of the feed rollers 14. The central processing unit 74 can therefore correct for the lag response in the system and provide a constant volume of material at the application tip 17 regardless of variances in the effective cross section of the build element.

The detailed description outlined above is considered to be illustrative only of the principles of the invention. Numerous changes and modifications will occur to those skilled in the art, and there is no intention to restrict the scope of the invention to the detailed description. The preferred embodiment of the invention having been described in detail, the scope of the invention should be defined by the following claims.

What is claimed is:

1. A machine for making three-dimensional physical objects from a solid build material element having a cross section by depositing molten build material element in multiple layers, comprising:

a dispensing head for receiving solid build material element and having an application tip for dispensing molten build material element;

an element advance mechanism operable at a variable controlled feed speed for supplying the solid build material element to the dispensing head;

sensing means positioned in sensing relation to the solid build material element, for sensing physical parameter data of the build element corresponding to the cross-section of the build element at a measured portion of the element, and for generating measurement signals corresponding thereto;

variable-speed drive means operatively connected to the element advance mechanism, for controlling the feed speed of the element advance mechanism;

a control operatively connected to the sensing means and operatively connected to the variable-speed drive means, for adjusting the speed of the element advance mechanism as a function of the measurement signals at times appropriate to compensate for a lag response between the sensing of physical parameter data of the build element and arrival of the measured build element portion at the application tip to thereby control the volumetric flow of molten build material element through the application tip.

2. The combination described in claim 1 wherein the solid build material element has an axis and the sensing means comprises:

a light emitting source;

a light detector;

the light emitting source and the detector position facing each other approximately 180 degrees apart with the axis of the element herebetween.

3. The combination described in claim 2 wherein the sensing means further comprises:

a second light emitting source;

a second light detector;

the second light emitting source and the light detector positioned facing each other approximately 180 degrees apart with the axis of the element therebetween; and the first light emitting source and the second light emitting source spaced approximately 90 degrees apart.

4. The combination described in claim 1 wherein the sensing means comprises a fiber optic sensor.

5. The combination described in claim 1 wherein the sensing means comprises an optical sensor.

6. The combination described in claim 1 wherein the sensing means comprises a miniature CCD camera.

7. The combination described in claim 1 wherein the solid build material element has an axis, and the sensing means comprises:

a plurality of sensor pairs disposed around the axis of the element at even intervals, each sensor pair comprising a light emitting source and a light detector spaced approximately 180 degrees apart.

8. The combination described in claim 1 wherein the drive means is a DC servo motor.

9. The combination described in claim 8 wherein:

the DC servo motor has an encoder feedback; and the encoder feedback provides the control with the speed of the servo motor.

10. The combination described in claim 1 wherein the drive means is a stepper motor and the element advance mechanism is a pair of feed rollers.

11. The combination described in claim 1 wherein the solid build material element has an axis and the sensing means comprises:

a light source disposed a predetermined distance from the axis of the element; and a linear CCD array disposed on the opposite side of the element axis.

12. The combination described in claim 11 wherein the light source is a tungsten halogen lamp.

13. The combination described in claim 11 wherein the solid build material element has an axis and the sensing means comprises:
- a rigid mount attached to the machine adjacent the axis of the element;
- a pair of shafts flexibly attached to the rigid mount;
- a pair of rollers, a said roller of said roller pair attached to each said shaft;
- a spring attached between said shafts; and
- a linear variable differential transformer having terminals, said transformer attached to said shafts therebetween, a terminal attached to each said roller.

14. The combination described in claim 1 wherein the sensing means comprises:
- a capacitive sensor having a pair of conducting plates and an insulator disposed between the plates;
- said capacitive sensor having a bore therethrough coplanar with the insulator, said bore exposing said conducting plates; and
- a capacitance meter having a pair of terminals, a said terminal of said terminal pair attached to each conducting plate.

15. The combination described in claim 14 wherein the insulator is mylar.

16. The combination described in claim 15 wherein the mylar is approximately 0.002 inches in thickness.

17. The combination described in claim 1 wherein the sensing means is disposed between the application tip and the element advancement mechanism.

18. The combination described in claim 17 wherein the sensing means is housed within a dimension control ring.

19. The combination described in claim 18 wherein the solid build material element is centered in the dimension control ring.

20. The combination described in claim 1 and further comprising:
- encoder means operatively connected to the control and the element advancement mechanism, for sensing the effective solid built material element velocity and generating velocity signals corresponding thereto, the control receiving the velocity signals and controlling the speed of the element advance mechanism as a function of the velocity signals and the measurement signals.

21. A volumetric feed control apparatus for use in a three-dimensional modeling machine of the type that builds physical objects from a solid build material element having a cross section by depositing molten build material element in multiple layers from the application tip of a dispensing head, said machine supplying the solid build material element to the dispensing head using an element advance mechanism operable at a variable controlled feed speed, the volumetric feed control apparatus comprising:
- sensing means positionable to be in sensing relation to the solid build material element, for sensing physical parameter data of the build element corresponding to the cross-section of the build element at a measured portion of the element, and for generating measurement signals corresponding thereto;
- variable-speed drive means operatively connectable to the element advance mechanism, for controlling the feed speed of the element advance mechanism; and
- a control operatively connected to the sensing means and operatively connected to the variable-speed drive means, for adjusting the speed of the element advance mechanism as a function of the measurement signals at times appropriate to compensate for a lag response between the sensing of physical parameter data of the build element and arrival of the measured build element portion at the application tip, to thereby control the volumetric flow of molten build material element through the application tip.

22. The combination described in claim 21 wherein the solid build material element has an axis and the sensing means comprises:
- a light emitting source;
- a light detector;
- the light emitting source and the detector position facing each other approximately 180 degrees apart with the axis of the element positioned therebetween.

23. The combination described in claim 22 wherein the sensing means further comprises:
- a second light emitting source;
- a second light detector;
- second light emitting source and the light detector positioned facing each other approximately 180 degrees apart with the axis of the element positioned therebetween; and
- the first light emitting source and the second light emitting source spaced approximately 90 degrees apart.

24. The combination described in claim 21 wherein the sensing means comprises a fiber optic sensor.

25. The combination described in claim 21 wherein the sensing means comprises an optical sensor.

26. The combination described in claim 21 wherein the sensing means comprises a miniature CCD camera.

27. The combination described in claim 21 wherein the solid build material element has an axis, and the sensing means comprises:
- a plurality of sensor pairs positionable around the axis of the element at even intervals, each sensor pair comprising a light emitting source and a light detector spaced approximately 180 degrees apart.

28. The combination described in claim 21 wherein the drive means is a DC servo motor.

29. The combination described in claim 28 wherein:
- the DC servo motor has an encoder feedback; and
- the encoder feedback provides the control with the speed of the servo motor.

30. The combination described in claim 21 wherein the drive means is a stepper motor.

31. The combination described in claim 21 wherein the solid build material element has an axis and the sensing means comprises:
- a light source positionable a predetermined distance from the axis of the element; and
- a linear CCD array positionable on the opposite side of the element axis.

32. The combination described in claim 31 wherein the light source is a tungsten halogen lamp.

33. The combination described in claim 21 wherein the solid build material element has an axis and the sensing means comprises:
- a rigid mount attachable to the machine adjacent the axis of the element;
- a pair of shafts flexibly attached to the rigid mount;
- a pair of rollers, a said roller of said roller pair attached to each said shaft;
- a spring attached between said shafts; and
- a linear variable differential transformer having terminals, said transformer attached to said shafts therebetween, a terminal attached to each said roller.

34. The combination described in claim 21 wherein the sensing means comprises:

a capacitive sensor having a pair of conducting plate, and an insulator disposed between the plates;

said capacitive sensor having a bore therethrough coplanar with the insulator, said bore exposing said conducting plates; and a capacitance meter having a pair of terminals, a said terminal of said terminal pair attached to each conducting plate.

35. The combination described in claim 34 wherein the insulator is mylar.

36. The combination described in claim 35 wherein the mylar is approximately 0.002 inches in thickness.

37. The combination described in claim 21 and further comprising:

encoder means operatively connectable to the control and to the element advancement mechanism, for sensing the effective solid build material element velocity and generating velocity signal corresponding thereto, the control receiving the velocity signals and controlling the speed of the element advance mechanism as a function of the velocity signals and the measurement signals.

38. In a machine for making three-dimensional physical objects from a solid build material element having a cross section by depositing molten build material element in multiple layers through the application tip of a dispensing head, said machine supplying the solid build material element to the dispensing head using an element advance mechanism operable at a variable controlled feed speed, a method for controlling the volumetric flow rate of the molten build material element at the application tip comprising the steps of:

sensing physical parameter data of the solid build material element corresponding to the cross section of the build element at a measured portion of the element, at a sensing position;

generating measurement signals corresponding to the sensed physical parameter data;

conveying the measurement signals to a control;

using the measurement signals to compute an effective cross section of the build material element;

providing the control with the distance between the sensing position and the application tip and the distance between the sensing position and the element advance mechanism;

computing a lag response due to the time lag between the sensing of physical parameter data of the build element and arrival of the measured build element portion at the application tip;

providing a variable-speed drive means operatively connected to the element advance mechanism for controlling the feed speed of the element advance mechanism; and supplying control signals from the control to the drive means to adjust the speed of the element advance mechanism as a function of the effective cross section, at times appropriate to compensate for the lag response.

39. The method of claim 38 and further comprising the steps of:

sensing the effective solid build material element velocity, using an encoding means;

generating velocity signals corresponding to the effective element velocity;

conveying the velocity signals to the control; and supplying control signals from the control to the drive means to control the speed of the element advance mechanism as a function of the velocity signals and the effective cross section.

40. The method of claim 38 wherein the drive means is a DC servo motor having an encoder feedback and further comprising the step of:

providing the control with the speed of the servo motor.

* * * * *

UNITED STATES PATENT AND TRADEMARK OFFICE
CERTIFICATE OF CORRECTION

PATENT NO. : 6,085,957
DATED : JULY 11, 2000
INVENTOR(S) : JOHN S. BATCHELDER ET AL.

It is certified that error appears in the above-identified patent and that said Letters Patent is hereby corrected as shown below:

Col. 9, line 1, delete "claim 11", insert -- claim 1 --

Col. 11, line 3, delete "plate", insert -- plates --

Signed and Sealed this

Seventeenth Day of April, 2001

Attest:

NICHOLAS P. GODICI

*Attesting Officer*　　　*Acting Director of the United States Patent and Trademark Office*